(12) United States Patent
Kundu et al.

(10) Patent No.: US 12,335,137 B2
(45) Date of Patent: Jun. 17, 2025

(54) SYSTEM AND METHOD FOR FACILITATING EFFICIENT MESSAGE MATCHING IN A NETWORK INTERFACE CONTROLLER (NIC)

(71) Applicant: Hewlett Packard Enterprise Development LP, Spring, TX (US)

(72) Inventors: Partha Pratim Kundu, Palo Alto, CA (US); Andrew S. Kopser, Seattle, WA (US); Duncan Roweth, Bristol (GB); Robert Alverson, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/544,914

(22) Filed: Dec. 19, 2023

(65) Prior Publication Data

US 2024/0121181 A1    Apr. 11, 2024

Related U.S. Application Data

(63) Continuation of application No. 17/594,531, filed as application No. PCT/US2020/024311 on Mar. 23, 2020, now Pat. No. 11,882,025.

(Continued)

(51) Int. Cl.
*G06F 13/42* (2006.01)
*G06F 9/50* (2006.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
CPC ... H04L 45/28; H04L 1/0083; H04L 43/0876; H04L 43/10; H04L 45/02; H04L 45/021; H04L 45/028; H04L 45/122; H04L 45/123; H04L 45/125; H04L 45/16; H04L 45/20; H04L 45/22; H04L 45/24; H04L 45/38; H04L 45/42; H04L 45/46; H04L 45/566; H04L 45/70; H04L 45/745; H04L 45/7453; H04L 47/11; H04L 47/12; H04L 47/122; H04L 47/18; H04L 47/20; H04L 47/22; H04L 47/24; H04L 47/2441; H04L 47/2466; H04L 47/2483; H04L 47/30; H04L 47/32; H04L 47/323; H04L 47/34;
(Continued)

(56) References Cited

U.S. PATENT DOCUMENTS 8,966,457 B2 *   2/2015  Ebcioglu ................... G06F 8/40
                                                    717/136
2018/0219804 A1 *  8/2018  Graham ................ H04L 49/901
(Continued)

*Primary Examiner* — Henry Tsai
*Assistant Examiner* — Kim T Huynh
(74) *Attorney, Agent, or Firm* — Yao Legal Services, Inc.

(57) ABSTRACT

A network interface controller (NIC) capable of performing message passing interface (MPI) list matching is provided. The NIC can include a host interface, a network interface, and a hardware list-processing engine (LPE). The host interface can couple the NIC to a host device. The network interface can couple the NIC to a network. During operation, the LPE can receive a match request and perform MPI list matching based on the received match request.

18 Claims, 9 Drawing Sheets

Related U.S. Application Data

(60) Provisional application No. 62/852,289, filed on May 23, 2019, provisional application No. 62/852,203, filed on May 23, 2019, provisional application No. 62/852,273, filed on May 23, 2019.

(51) Int. Cl.

| | |
|---|---|
| G06F 9/54 | (2006.01) |
| G06F 12/0862 | (2016.01) |
| G06F 12/1036 | (2016.01) |
| G06F 12/1045 | (2016.01) |
| G06F 13/14 | (2006.01) |
| G06F 13/16 | (2006.01) |
| G06F 13/28 | (2006.01) |
| G06F 13/38 | (2006.01) |
| G06F 13/40 | (2006.01) |
| G06F 15/173 | (2006.01) |
| H04L 1/00 | (2006.01) |
| H04L 43/0876 | (2022.01) |
| H04L 43/10 | (2022.01) |
| H04L 45/00 | (2022.01) |
| H04L 45/02 | (2022.01) |
| H04L 45/021 | (2022.01) |
| H04L 45/028 | (2022.01) |
| H04L 45/12 | (2022.01) |
| H04L 45/122 | (2022.01) |
| H04L 45/125 | (2022.01) |
| H04L 45/16 | (2022.01) |
| H04L 45/24 | (2022.01) |
| H04L 45/28 | (2022.01) |
| H04L 45/42 | (2022.01) |
| H04L 45/745 | (2022.01) |
| H04L 45/7453 | (2022.01) |
| H04L 47/10 | (2022.01) |
| H04L 47/11 | (2022.01) |
| H04L 47/12 | (2022.01) |
| H04L 47/122 | (2022.01) |
| H04L 47/20 | (2022.01) |
| H04L 47/22 | (2022.01) |
| H04L 47/24 | (2022.01) |
| H04L 47/2441 | (2022.01) |
| H04L 47/2466 | (2022.01) |
| H04L 47/2483 | (2022.01) |
| H04L 47/30 | (2022.01) |
| H04L 47/32 | (2022.01) |
| H04L 47/34 | (2022.01) |
| H04L 47/52 | (2022.01) |
| H04L 47/62 | (2022.01) |
| H04L 47/625 | (2022.01) |
| H04L 47/6275 | (2022.01) |
| H04L 47/629 | (2022.01) |
| H04L 47/76 | (2022.01) |
| H04L 47/762 | (2022.01) |
| H04L 47/78 | (2022.01) |
| H04L 47/80 | (2022.01) |
| H04L 49/00 | (2022.01) |
| H04L 49/101 | (2022.01) |
| H04L 49/15 | (2022.01) |
| H04L 49/90 | (2022.01) |
| H04L 49/9005 | (2022.01) |
| H04L 49/9047 | (2022.01) |
| H04L 67/1097 | (2022.01) |
| H04L 69/22 | (2022.01) |
| H04L 69/40 | (2022.01) |
| H04L 69/28 | (2022.01) |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(58) Field of Classification Search
CPC ....... H04L 47/39; H04L 47/52; H04L 47/621; H04L 47/6235; H04L 47/626; H04L 47/6275; H04L 47/629; H04L 47/76; H04L 47/762; H04L 47/781; H04L 47/80; H04L 49/101; H04L 49/15; H04L 49/30; H04L 49/3009; H04L 49/3018; H04L 49/3027; H04L 49/90; H04L 49/9005; H04L 49/9021; H04L 49/9036; H04L 49/9047; H04L 67/1097; H04L 69/22; H04L 69/40; H04L 69/28; H04L 12/4633; H04L 47/125; H04L 47/26; H04L 47/263; H04L 47/6255; G06F 9/505; G06F 9/546; G06F 12/0862; G06F 12/1036; G06F 12/1063; G06F 13/14; G06F 13/16; G06F 13/1642; G06F 13/1673; G06F 13/1689; G06F 13/28; G06F 13/385; G06F 13/4022; G06F 13/4068; G06F 13/4221; G06F 15/17331; G06F 2212/50; G06F 2213/0026; G06F 2213/3808; G06F
13/4265
See application file for complete search history.

(56) References Cited

U.S. PATENT DOCUMENTS

2019/0121781 A1* 4/2019 Kasichainula .... G06F 15/17331
2023/0012553 A1* 1/2023 Ahmadi .................. G06F 17/16

* cited by examiner

SYSTEM AND METHOD FOR FACILITATING EFFICIENT MESSAGE MATCHING IN A NETWORK INTERFACE CONTROLLER (NIC)

CROSS REFERENCE TO RELATED APPLICATIONS

This application is a continuation of U.S. patent application Ser. No. 17/594,531, filed on Oct. 21, 2021, which application is a national stage of International Application No. PCT/US2020/024311, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

BACKGROUND

Field

This is generally related to the technical field of networking. More specifically, this disclosure is related to systems and methods for facilitating high-speed MPI (message passing interface) list matching in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of performing message passing interface (MPI) list matching is provided. The NIC can include a host interface, a network interface, and a hardware list-processing engine (LPE). The host interface can couple the NIC to a host device. The network interface can couple the NIC to a network. During operation, the LPE can receive a match request and perform MPI list matching based on the received match request.

BRIEF DESCRIPTION OF THE FIGURES

In the figures, like reference numerals refer to the same figure elements.

DETAILED DESCRIPTION

Figure 1:
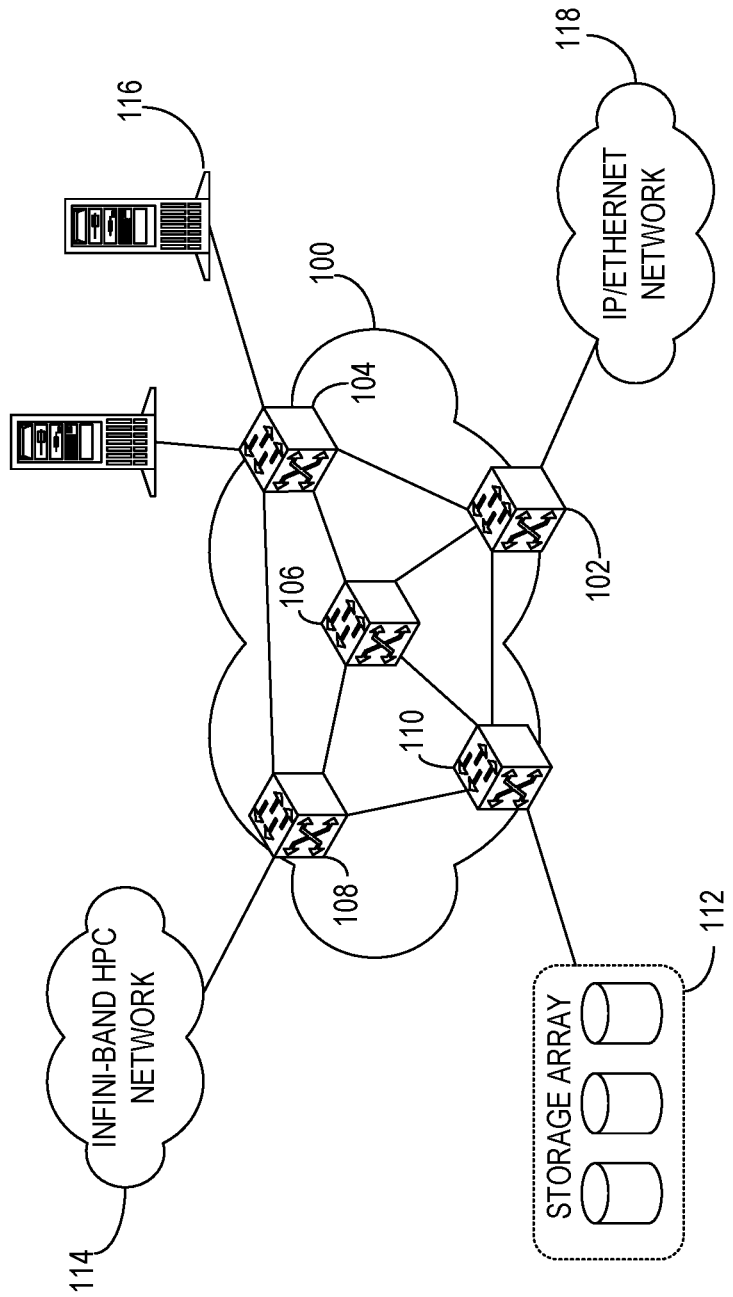
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient list matching in a network interface controller (NIC). The NIC implements a hardware list-processing engine coupled to a memory unit. The list-processing engine can achieve high-speed list matching. The list-processing engine (LPE) can perform atomic search and search-with-delete operators in the various lists defined by the message passing interface (MPI) protocol and can dispatch list operations to correct matching units. To enhance speed, multiple processing engines can be used, and each processing engine can include multiple memory banks, which are interconnected using a crossbar. In addition, the LPE achieves list-matching acceleration by separation of endpoint network interfaces. The list-matching hardware can reduce latency by overlapping the matching-attempt pipeline state with the match termination condition, and can use unified search pipeline for priority and unexpected lists and for network search and host append commands. The LPE hardware can also use a unified processing pipeline to search persistent list entries pertaining to an unordered network interface as well as to search entries pertaining to an ordered network interface. The NIC can also process MPI messages, using either the "eager" protocol or the "rendezvous" protocol in an efficient manner.

One embodiment provides a NIC capable of performing MPI list matching. The NIC can include a host interface, a network interface, and a hardware LPE. The host interface can couple the NIC to a host device. The network interface can couple the NIC to a network. During operation, the LPE can receive a match request and perform MPI list matching based on the received match request.

In a variation on this embodiment, the match request can include a match request corresponding to a command received via the host interface or a match request corresponding to a message received via the network interface.

In a further variation, the NIC can include a first set of match-request queues for match requests corresponding to received commands and a second set of match-request queues for match requests corresponding to received messages. The number of queues in the first or second set of match-request queues corresponds to the number of physical endpoints supported by the NIC.

In a further variation, the message is an MPI message.

In a further variation, the message is based on an eager protocol or a rendezvous protocol associated with MPI.

In a variation on this embodiment, the hardware list-processing engine can include a plurality of processing elements; and a respective processing element comprises a plurality of matching engines and a plurality of memory banks storing one or more lists, wherein the memory banks are interconnected with the matching engines using a crossbar.

In a further variation, a respective matching engine can include a unified search pipeline for searching the one or more lists, and the one or more lists can include a priority list and an unexpected list.

In a further variation, a respective matching engine can include a single pipeline stage to perform, in parallel, a match operation on a previous match request and a computation to determine a current read or write address.

In a variation on this embodiment, the hardware list-processing engine can include a persistent list entry cache to store previously matched list entries to enable fast searches.

In a variation on this embodiment, the list-processing engine can perform atomic search operations in a plurality of lists.

Figure 2A:
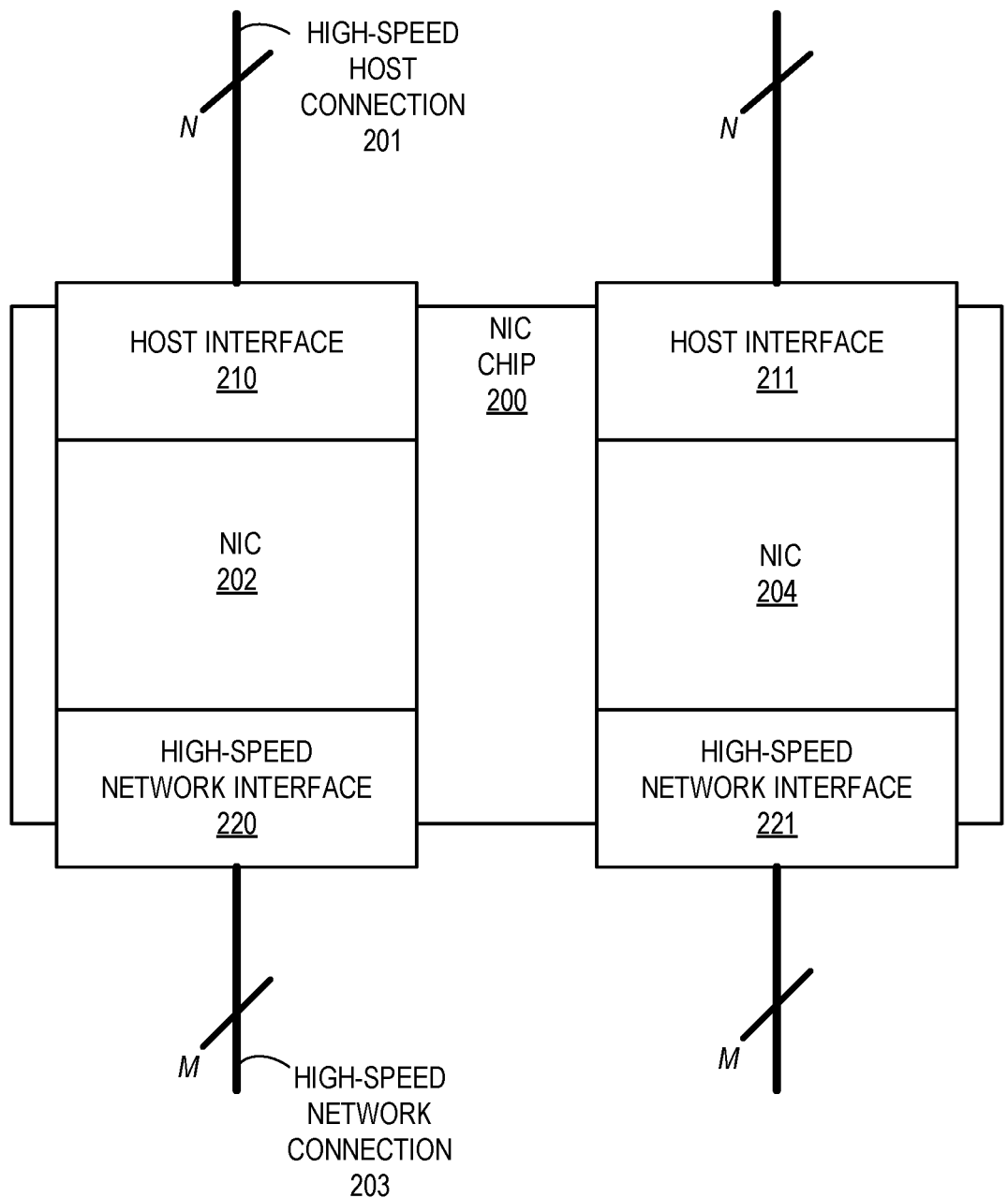
FIG. 2A shows an exemplary NIC chip with a plurality of NICs.

In this disclosure, the description in conjunction with FIG. 1 is associated with the network architecture, and the descriptions in conjunction with FIG. 2A and onward provide more details on the architecture and operations associated with a NIC that supports efficient MPI list matching.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on message passing interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and atomic memory operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
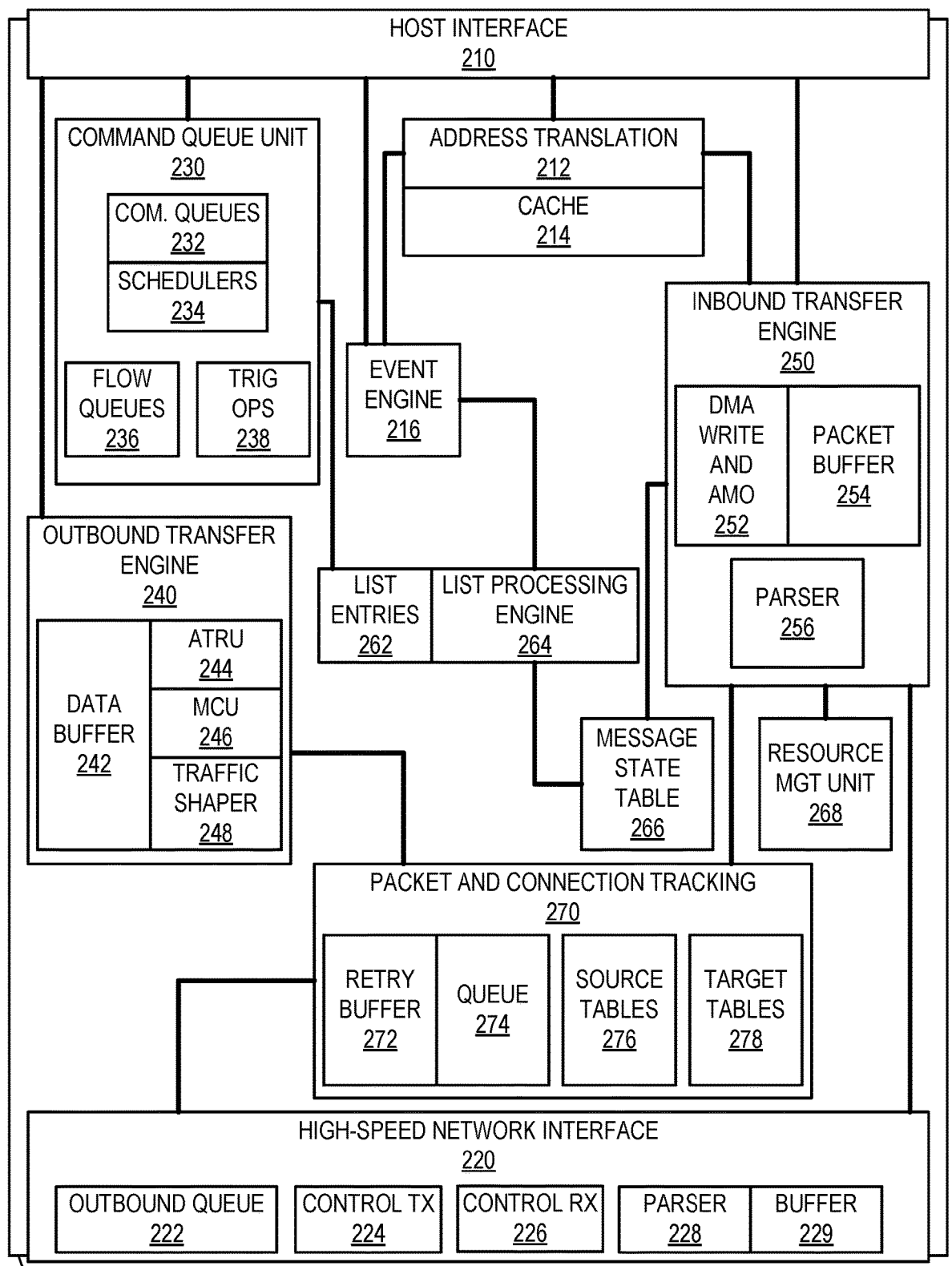
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a command queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers. In some embodiments, command queues 232 can be maintained in the main memory of the host. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The data received from the host can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a list processing engine (LPE) 264 or a message state table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an event engine (EE) 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

MPI List Matching

In MPI, send/receive operations are identified with an envelope that can include a number of parameters such as source, destination, message ID, and communicator. The envelope can be used to match a given message to its corresponding user buffer. The whole list of buffers posted by a given process can be referred to as the matching list, and the process of finding the corresponding buffer from the matching list to a given buffer is referred as list matching or tag matching.

In some embodiments, the NIC can provide hardware acceleration of MPI list matching, and the list-processing engine in the NIC can include a plurality (e.g., 2048) of physical endpoints. Each physical endpoint can include four lists: "priority," "overflow," "unexpected," and "software request." The software request list can provide a graceful transition from hardware offload to software managed lists. The priority, overflow, and request lists contain entries that include match criteria and memory descriptor information. The unexpected list contains header information of messages for which a list entry has not been set up in advance. The LPE block of the NIC can include a memory storage for a number (e.g., 64 k) of list entries, divided among the match entries (for matching interface), list entries (for non-matching interface), and unexpected list entries.

In some embodiments, the LPE block of the NIC can be divided into multiple (e.g., four) processing engines, thus enabling the LPE to exploit process-level parallelism in applications or workloads. Each processing engine can access a subset of the list entries. For example, if the LPE block includes a total of 64 k list entries and there are four processing engines, each processing engine can access 16 k list entries. Software can be responsible for allocating physical endpoints to processing engines to provide load balancing.

The LPE can include two list-matching interfaces: one interface receiving target-side commands from the CQ unit, and the other interface receiving message-match requests from an IXE. The IXE sends the first packet of each message to the LPE; the LPE searches the appropriate lists. If a matching entry is found, it can be unlinked and returned to IXE; otherwise, the header may be appended to the unexpected list. Each interface can be called matching or non-matching, depending on the setting of the physical endpoint. CQ command requests and IXE network requests are called match requests in both cases.

In some embodiments, the interfaces for MPI may be initialized in the disabled state. Message matching of incoming traffic only occurs in the hardware offload state. More specifically, the processing engine can perform atomic search and search-with-delete operations in the priority, overflow, and unexpected lists. During the search, the processing engine can dispatch list operations to a correct matching unit.

Figure 3A:
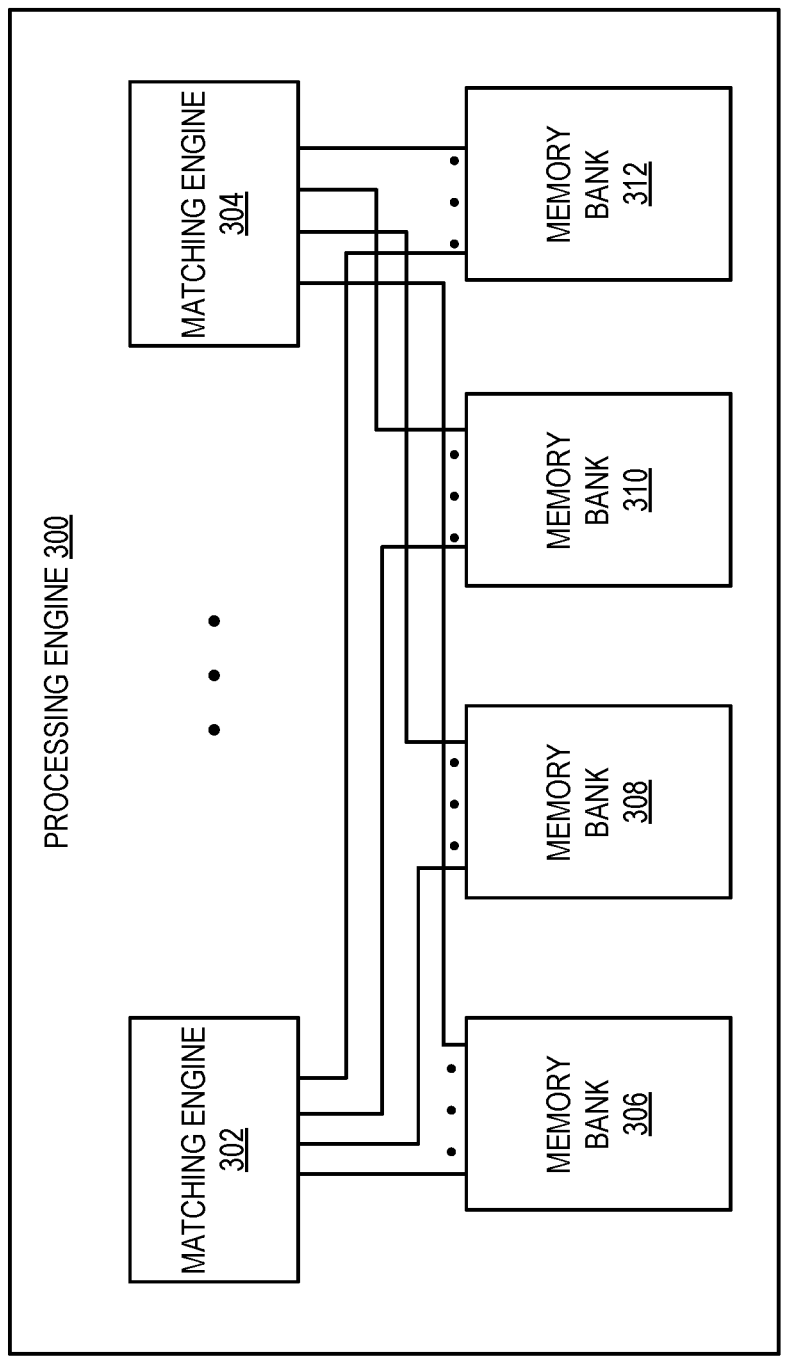
FIG. 3A shows an exemplary architecture of a processing engine.

FIG. 3A shows the exemplary architecture of a processing engine. In this example, processing engine 300 can include a plurality of matching engines (e.g., matching engines 302 and 304) and four memory banks (e.g., memory banks 306, 308, 310, and 312).

In some embodiments, processing engine 300 can include up to eight matching engines. The memory banks can be interconnected to the matching engines using a crossbar to minimize bank conflicts and obtain high parallelism and utilization of the matching engines. Each matching engine can generate a memory address to any of the memory banks in processing engine 300. The multiple matching engines (e.g., matching engines 302 and 304) operate independently of each other. However, these multiple matching engines need to arbitrate for access to the memory banks.

Figure 3B:
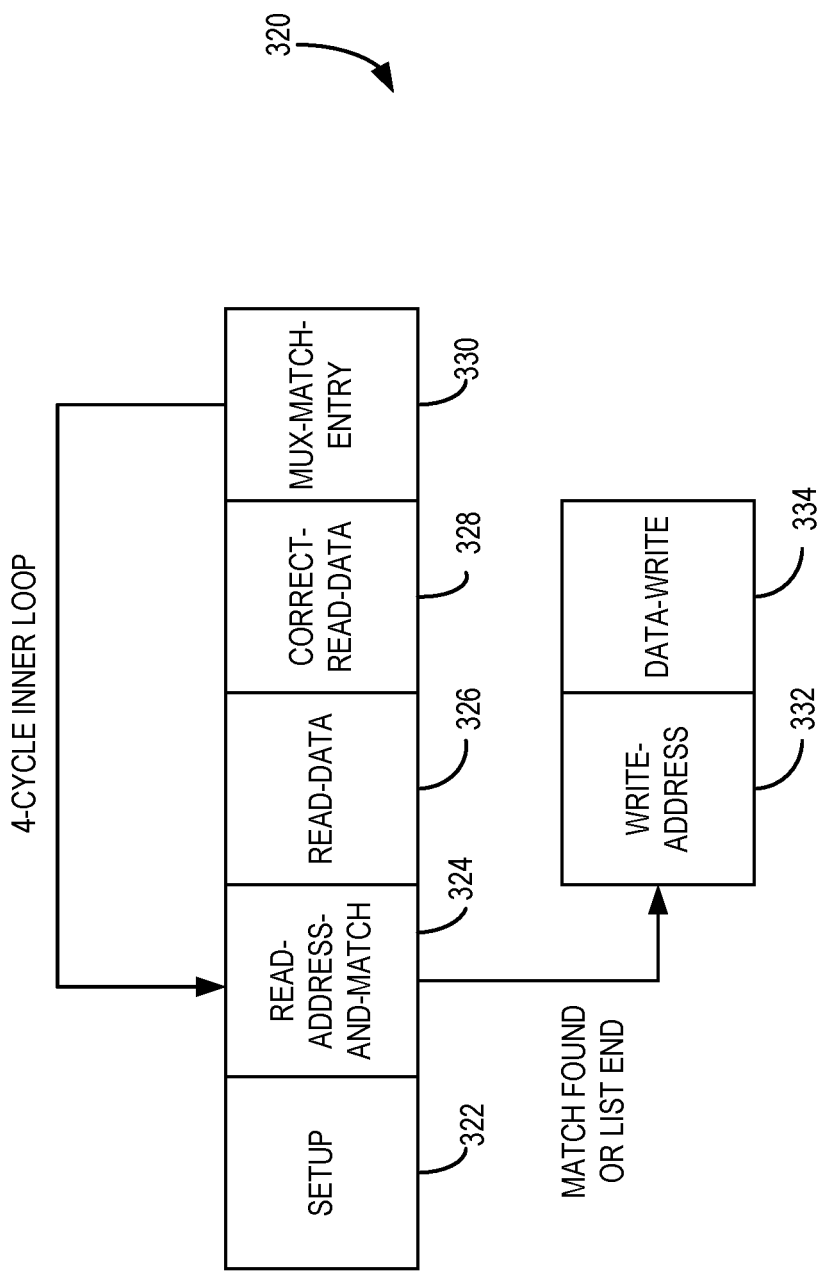
FIG. 3B shows an exemplary operation pipeline of a matching engine.

FIG. 3B shows an exemplary operation pipeline of a matching engine. Matching-engine pipeline 320 can include a number of stages, a setup stage 322, a read-address-and-match stage 324, a read-data stage 326, a correct-read-data stage 328, a mux-match-entry stage 330, a write-address stage 332, and a data-write stage 334.

At setup stage 322, the matching engine captures the match request information from the ready-request queue (RRQ). At read-address-and-match stage 324, the matching engine initiates the read request in each memory bank. Each matching engine can have a logic that decides whether to make a read or write request and to which memory bank. In some embodiments, each memory bank can have an arbiter used to select a matching engine and multiplex the address. Note that, if there are eight parallel matching engines, the arbiter can be an 8:1 arbiter. In parallel with the read address computation, read-address-and-match stage 324 also checks if there is a match on the previous match entry. If there is, it prepares the write update (computes a new offset or deletes an entry). The address and data are then registered to the memory bank at write-address stage 332 and data-write stage 334. At write-address stage 332, the matching engine starts the write access; and at data-write stage 334, the matching engine completes the write operation.

At read-data stage 326, the read data is registered on the output of each memory bank. At correct-read-data stage 328, the read data is corrected at the memory bank. At mux-match-entry stage 330, a multiplexer at each matching engine captures the match entry, which includes the new current address. A number of inner loops are performed, with each loop including read-address-and-match stage 324, read-data stage 326, correct-read-data stage 328, and mux-match-entry stage 330. For the case with four memory banks, matching-engine pipeline 320 can include four cycles. Each matching engine includes space to hold the result of each operation. An arbiter selects a result from the multiple matching engines to send to the output arbiter block. When the output arbiter block consumes a result, the matching engine that produces the result can fetch another command from the RRQ.

The pipeline shown in FIG. 3B can provide a number of advantages. First, the overlapping between the match-attempt pipeline stage and the match termination condition (e.g., read-address-and-match stage 324) can reduce latency in the matching engine. Second, pipeline 320 can provide a unified search pipeline for searching the priority and unexpected list and for network searches and host append commands.

In some embodiments, to increase parallelism and avoid blocking by endpoint and traffic class, the NIC can provide list-matching acceleration by separation of queues, with each endpoint network interface having its own queue. More specifically, the match-request queues ensure that, for matching interfaces, only one operation per physical endpoint is processed at a time; and for non-matching interfaces, concurrent access to certain persistent list entries can be allowed. Within a physical endpoint, command requests need to be performed in the order that they arrive, and network match requests need to be performed in the order that they arrive. However, there is no ordering requirement between commands and network requests. The separated queues also ensure that requests from one physical endpoint cannot be blocked by requests from another physical endpoint. Similarly, requests in one traffic class cannot block requests in other traffic classes.

Figure 4A:
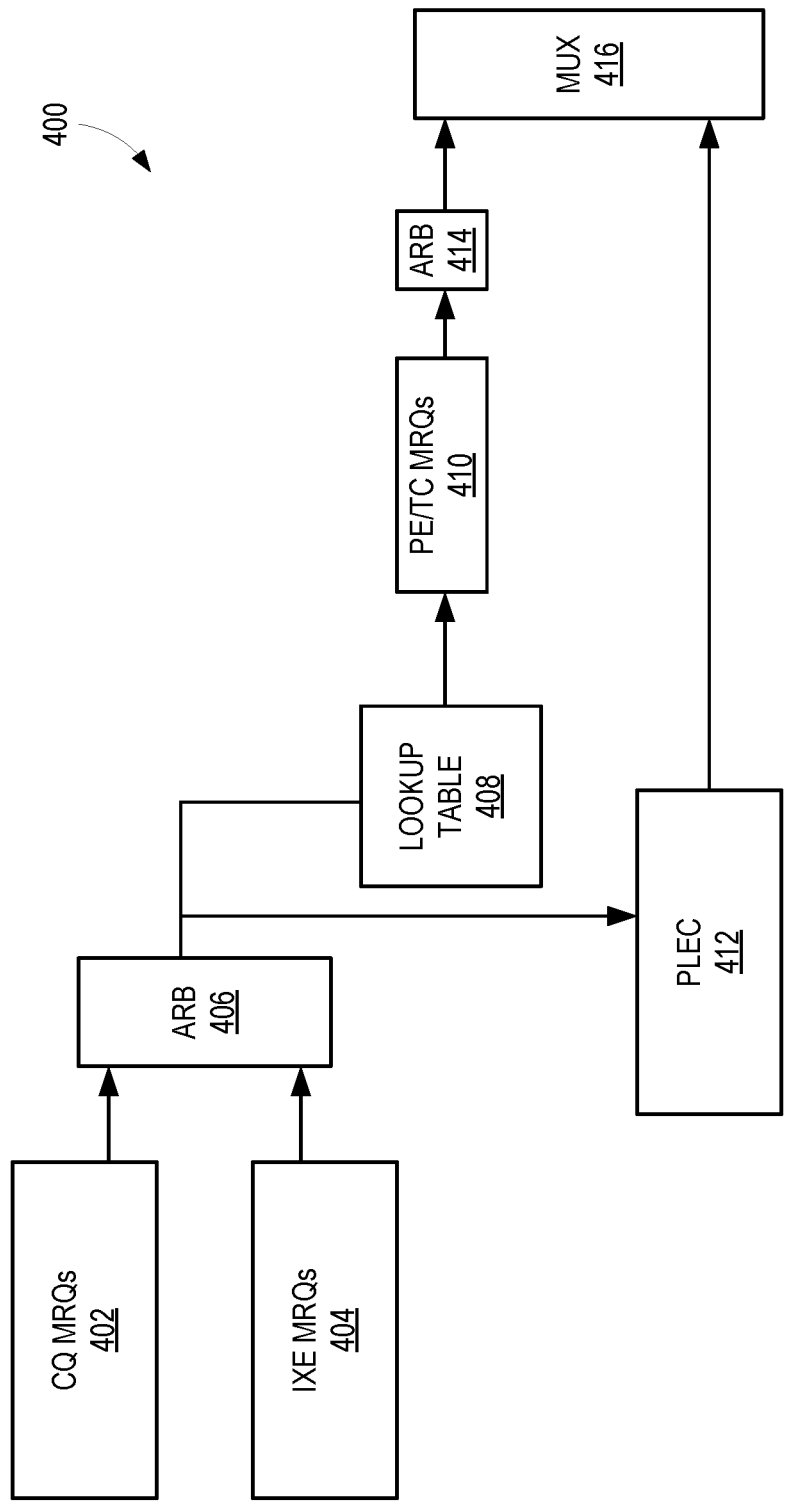
FIG. 4A illustrates exemplary match request-queues.

FIG. 4A illustrates exemplary match request-queues. Match-request-queuing block 400 can include two ranks of queues. The first rank of queues includes CQ match-request queues (MRQs) 402 for queuing CQ commands and IXE match-request queues 404 for queuing IXE requests, with each queue indexed by the physical portal index. Each physical endpoint corresponds to a CQ match-request queue and an IXE match-request queue. For a NIC supporting 2048 physical endpoints, CQ match-request queues 402 can include 2048 CQ match-request queues, and IXE match-request queues 404 can include 2048 IXE match-request queues.

One or more arbitrators 406 can be used to select between CQ match-request queues 402 and IXE match-request queues 404, and to select among the plurality of queues in each type of queue. In some embodiments, a standard arbitration mechanism (e.g., round-robin) can be used for arbitration.

When a match request is dequeued from one of these queues, a lookup table 408 is inspected to determine the processing engine (PE) for the physical portal index. Lookup table 408 can be an array of flops that holds the processing engine number for each physical endpoint and can be accessed in parallel. The match request is then enqueued in an appropriate processing-engine/traffic-class match request queue, which belongs to the second rank of queues (processing-engine/traffic-class (PE/TC) MRQs 410) unless it is an IXE request that matches in the persistent list entry (LE) cache (PLEC) 412. A detailed discussion of PLEC 412 follows. An arbitrator 414 can select among PE/TC MRQs 410, and a multiplexer 416 can multiplex the output of arbitrator 414 and PLEC 412.

In some embodiments, to further increase the list-matching speed, the system can also use a unified processing pipeline to search persistent list entries pertaining to an unordered network interface and to search entries pertaining to an ordered network interface. More specifically, the PLEC enables very fast, one-unit delay lookups.

Figure 4B:
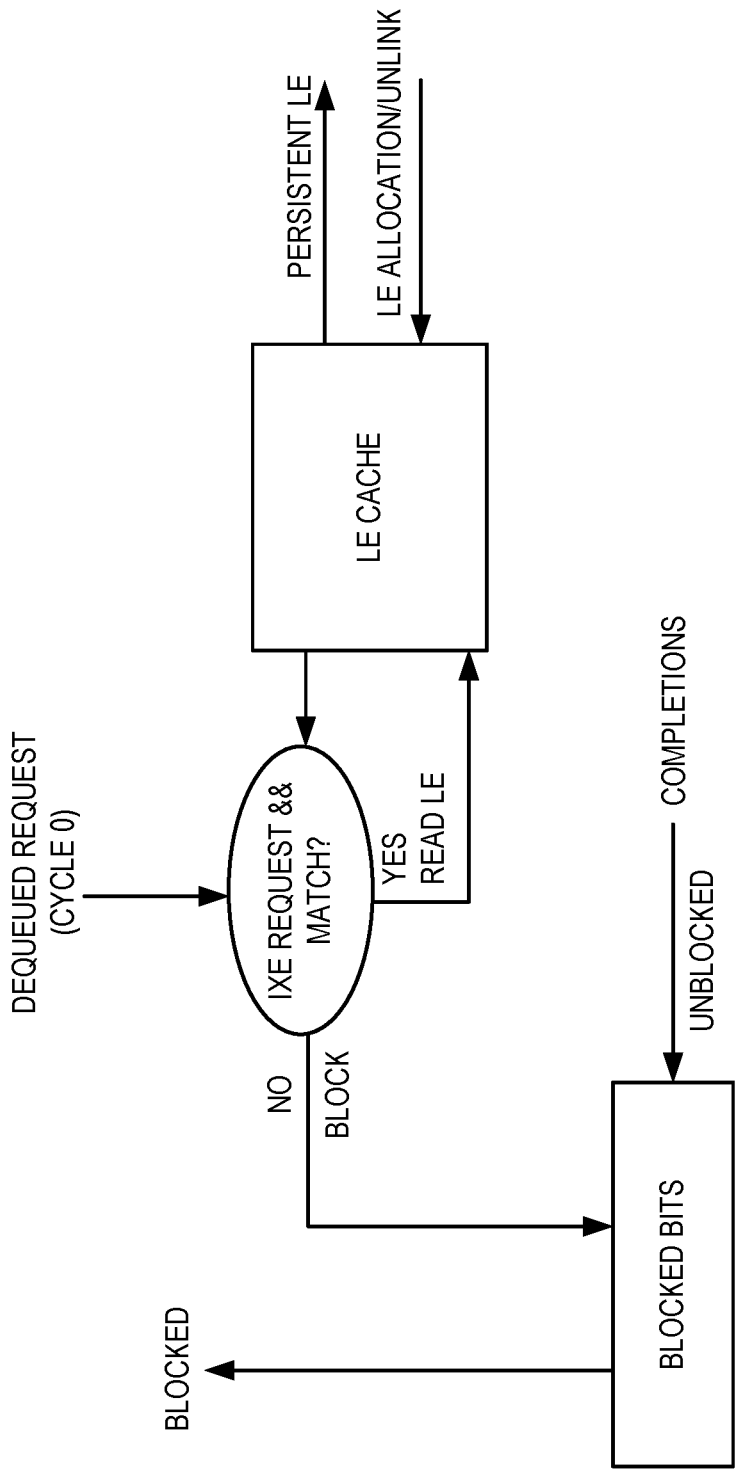
FIG. 4B shows an exemplary block diagram of a persistent list entry cache (PLEC).

FIG. 4B shows an exemplary block diagram of a persistent list entry cache (PLEC). The PLEC stores a number of entries (e.g., up to 256), matching on the physical portal index. When a physical endpoint has an entry in the cache, the PLEC allows its physical endpoint match request queue to be dequeued at a full rate without blocking.

When an IXE match-request queue (MRQ) is dequeued for a physical endpoint that matches in the PLEC, the PLEC forwards the list entry (LE) to the memory block that stores the match requests. When the CQ MRQ is dequeued, or when the IXE MRQ is dequeued and misses in the PLEC, a blocked bit is set for the physical endpoint. The PLEC maintains a blocked bit for each physical endpoint, ensuring that matching requests and commands are processed atomically, while non-matching IXE requests to qualified persistent list entries are satisfied without blocking.

The PLEC intercepts IXE requests that match in its cache before they are enqueued in the processing-engine/traffic-class queue. When a persistent list entry is copied from the cache, a dequeue is not initiated from the processing-engine/traffic-class queue on that cycle so that the persistent link entry (LE) may advance through the pipeline to the memory of the physical endpoint. More specifically, when a PLEC hit occurs, a dequeue from the PE/TC MRQ is suppressed in order to create a bubble in the pipeline. The dequeue is suppressed as the PLEC memory (i.e., the LE cache) is read so that the PLEC data is available when the bubble occurs. The LE from the PLEC and its match-request ID can be forwarded to the memory block of the physical endpoint.

The PLEC receives allocation and de-allocation requests from the processing engines. An allocation request arrives when a processing engine matches a network request with a persistent LE on the priority list that has events relating to packet matching disabled, in a non-matching, non-space-checking physical endpoint. An allocation request for a physical endpoint that hits an existing entry in the PLEC has no effect. Otherwise, an entry is allocated. If the cache is full, an entry is evicted using round-robin selection. When a processing engine unlinks a cacheable list entry, it sends a de-allocation request to the PLEC. If the PLEC contains an entry with a matching physical endpoint, the PLEC evicts the corresponding entry.

The LPE block on the NIC plays an important role in processing MPI messages. As discussed before, MPI implements the "eager" protocol for handling small messages and the "rendezvous" protocol for handling large messages. More specifically, eager implies that the data is sent along with the PUT command (message). The system software sets an upper limit for the Eager messages. For messages having sizes beyond the limit of the Eager message, MPI requires the messages to be sent using the rendezvous protocol.

In the software implementation of the eager protocol, data is delivered to a system buffer, from which the data must be copied to a user buffer. Although this approach reduces synchronization, it is expensive in terms of memory capacity and memory bandwidth. In some embodiments, the NIC can provide a mechanism for the eager messages to be written directly to the user's buffer, in cases where the target address can be determined quickly.

More specifically, when the LPE receives the first request packet (which contains the MPI message envelope), it searches the physical endpoint's priority list for a matching buffer. The matching can be performed based on the source, a set of match bits carried in the message, and buffer-specific match and ignore bits. The matched list entry consists of information that includes the start address, length, translation context, and various attributes where the PUT data (i.e., the eager message) is written, thus allowing the direct-memory access (DMA) dispatch logic to write data directly into the user buffer. If no match is found in the priority list, the LPE searches the overflow list for a description of the memory parameters into which it can write the PUT data, and appends a list entry describing the message to the unexpected list.

In the software implementation of the rendezvous protocol, the bulk data transfer is delayed until the target address is known. While this approach reduces the use of system memory, it requires software intervention in order to ensure progression. In some embodiments, the rendezvous protocol is offloaded to the NIC, providing strong progression.

More specifically, when transferring large MPI messages, the initiator can send a small initial message containing the MPI envelope used for matching and a modest amount of eager data. On completion of the match operation, the target performs a GET to transfer the bulk data to the user buffer. This can enhance the network performance, because bulk data is delivered as GET responses, which are unordered. The network can adaptively route them on a packet-by-packet basis.

If a rendezvous request ends up on the unexpected list, the GET is launched when the user process posts the matching append. Launch of the rendezvous GET is the same for both cases; it is the completion of the match of a rendezvous PUT request that triggers the launch.

This is a valuable offload. MPI applications are expected to post non-blocking receives early and then return to computation. Offloading rendezvous to the NIC ensures good overlap of computation and communication. The NIC performs the match and asynchronously instantiates the bulk data movement, thus providing strong progression.

Figure 5:
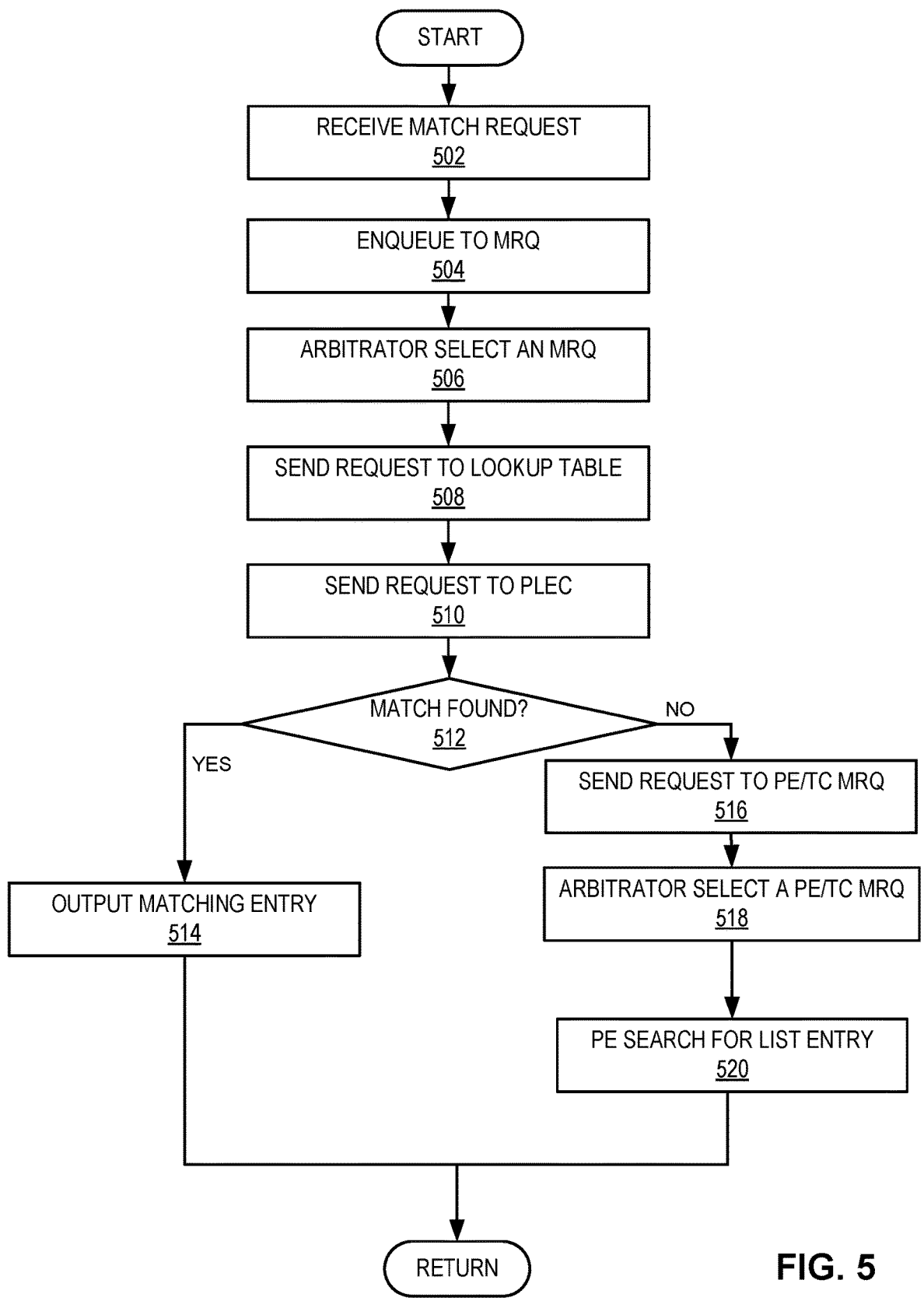
FIG. 5 shows a flow chart of performing list matching in a NIC.

FIG. 5 shows a flow chart of performing list matching in a NIC. During operation, the NIC may receive a match request (operation 502). The match request can be a command from the CQ for manipulating the lists or updating the physical endpoint state, or a message-match request from the IXE. The match request can be enqueued to an appropriate MRQ based on its type (operation 504). An arbitrator selects an MRQ to dequeue a match request (operation 506) and sends the dequeued match request to a lookup table, also referred to as the processing engine map, to determine a processing engine for processing the match request (operation 508). The determination can be based on the physical portal index (i.e., the identification of the physical endpoint).

The match request is also sent to the PLEC (operation 510), which attempts to find a match (operation 512). In response to a match found in the PLEC, the PLEC outputs the matching entry (operation 514). Otherwise, the match request is sent to a PE/TC MRQ (operation 516). An arbitrator selects a PE/TC MRQ to dequeue (operation 518). In some embodiments, the arbitration may occur in two steps. At the first step, a ready processing engine is selected using round-robin. At the second step, a ready TC within that processing engine can be selected using a weighted round-robin arbitration, with each TC having a predetermined weight factor.

The dequeued request from the PE/TC MRQ is sent to the corresponding processing engine, which in turn searches for the matching list entry (operation 520). The matching operations of the processing engine are shown in FIG. 3B.

Exemplary Computer System

Figure 6:
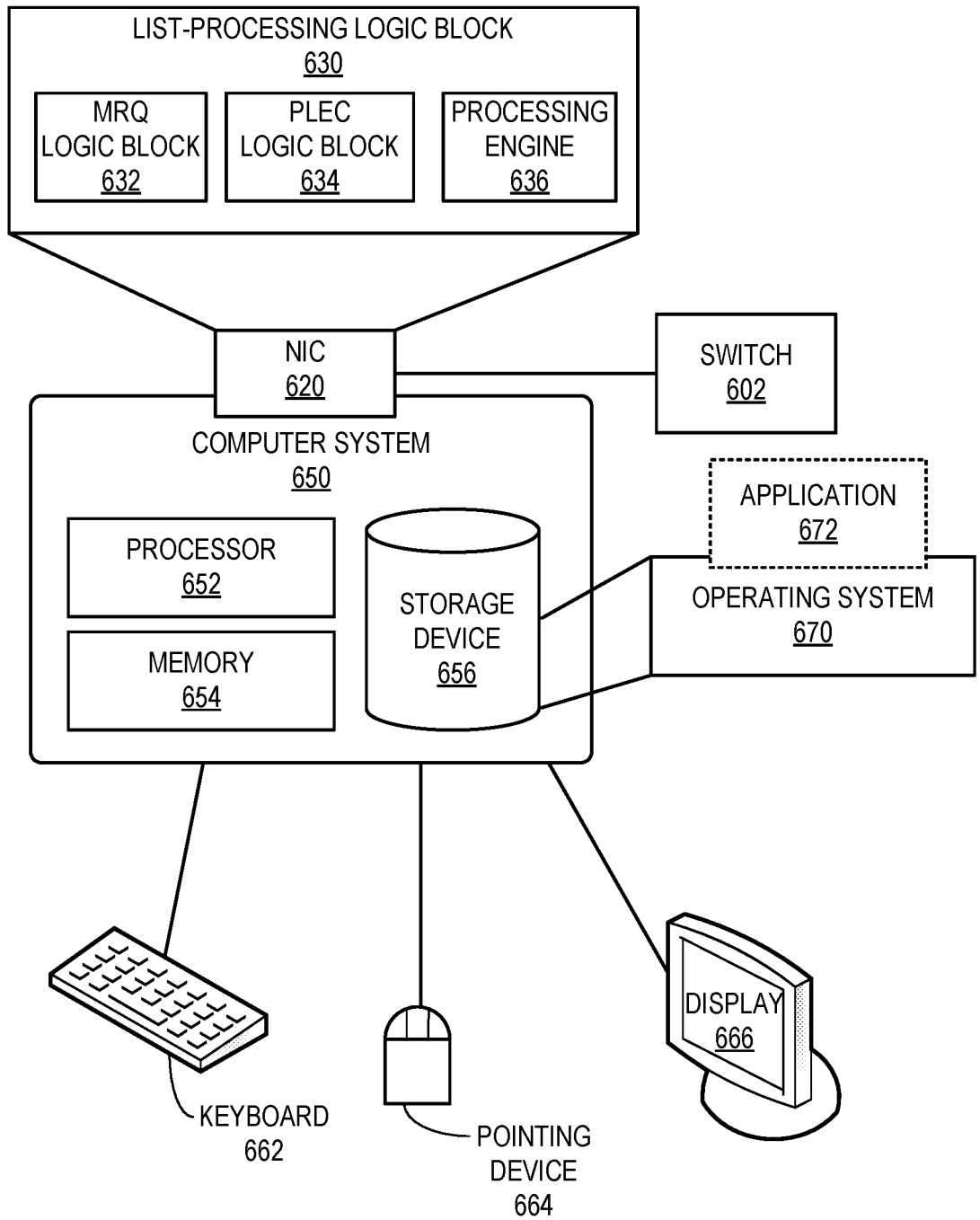
FIG. 6 shows an exemplary computer system equipped with a NIC that facilitates MPI list matching.

FIG. 6 shows an exemplary computer system equipped with a NIC that facilitates MPI list matching. Computer system 650 includes a processor 652, a memory device 654, and a storage device 656. Memory device 654 can include a volatile memory device (e.g., a dual in-line memory module (DIMM)). Furthermore, computer system 650 can be coupled to a keyboard 662, a pointing device 664, and a display device 666. Storage device 656 can store an operating system 670. An application 672 can operate on operating system 670.

Computer system 650 can be equipped with a host interface coupling a NIC 620 that facilitates efficient data request management. NIC 620 can provide one or more HNIs to computer system 650. NIC 620 can be coupled to a switch 602 via one of the HNIs. NIC 620 can include a list-processing logic block 630, as described in conjunction with FIG. 2B. List-processing logic block 630 can include a match-request queue (MRQ) logic block 632 that stores to-be-processed match requests, an PLEC logic block 634 that facilitates fast lookup, and a processing engine 636 for matching the incoming match request to a list entry stored in the memory bank.

In summary, the present disclosure describes a NIC that facilitates MPI list matching. The NIC can include a host interface, a network interface, and a hardware LPE. The host interface can couple the NIC to a host device. The network interface can couple the NIC to a network. The hardware LPE can achieve high-speed list matching. A high degree of parallelism can be achieved by implementing multiple processing engines (PEs) and multiple memory banks within a processing engine. Because each processing engine or TC is allocated with its own queue, the system prevents a processing engine or TC from blocking queues of other processing engine or TCs. In the hardware list-processing engine, the match pipeline stage and the match termination condition overlap to reduce latency. The NIC also enables the offloading of the processing of the MPI messages, including both eager and rendezvous messages.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
    a host interface;
    a network interface; and
    a hardware list-processing engine (LPE) block comprising a plurality of hardware matching engines and a plurality of memory banks storing a plurality of list entries, the hardware matching engines interconnected with the memory banks via a crossbar, respective hardware matching engine to perform message passing interface (MPI) list matching based on a received first match request and the list entries stored in the memory banks, and the respective hardware matching engine comprising multiple pipeline stages, with a single pipeline stage to perform, in parallel, a match operation on a previously received second match request and a computation operation to determine a current read or write address associated with the first match request.

2. The network interface controller of claim 1, wherein the LPE block further comprises:
    a first list-matching interface to receive host-side commands from the host interface; and
    a second list-matching interface to receive MPI messages from the network interface.

3. The network interface controller of claim 2, wherein the LPE block further comprises:
    a first set of match-request queues for queuing match requests corresponding to the received host-side commands; and
    a second set of match-request queues for queuing match requests corresponding to the received MPI messages.

4. The network interface controller of claim 3, wherein queues in each of the first and second sets of match-request queues corresponds to physical endpoints supported by the network interface controller.

5. The network interface controller of claim 4, wherein a respective physical endpoint comprises at least a priority list and an unexpected list.

6. The network interface controller of claim 5, wherein the respective matching engine comprises a unified search pipeline for searching the priority list and the unexpected list.

7. The network interface controller of claim 3, wherein the LPE block further comprises an arbitrator for selecting a match-request queue for dequeuing from the first and second sets of match-request queues.

8. The network interface controller of claim 2, wherein the respective matching engine is to process the MPI messages based on an eager protocol or a rendezvous protocol.

9. The network interface controller of claim 1, wherein the LPE block further comprises a persistent list-entry cache to store previously matched list entries to facilitate fast searches.

10. A method, comprising:
    receiving, at a network interface controller (NIC), a first match request, the NIC comprising a host interface and a network interface; and
    performing, by a hardware list-processing engine (LPE) in the NIC, message passing interface (MPI) list matching based on the received first match request;
    wherein the LPE comprises a plurality of hardware matching engines and a plurality of memory banks storing a plurality of list entries;
    wherein the hardware matching engines and the memory banks are interconnected via a crossbar; and
    wherein a respective hardware matching engine comprises multiple pipeline stages, with a single pipeline stage to perform, in parallel, a match operation on a previously received second match request and a computation operation to determine a current read or write address associated with the first match request.

11. The method of claim 10, wherein the first match request comprises:
    a match request corresponding to a host-side command received via the host interface; or
    a match request corresponding to an MPI message received via the network interface.

12. The method of claim 11, further comprising:
    enqueuing, by the LPE, the match request corresponding to the host-side command in a first set of match-request queues; or
    enqueuing, by the LPE, the match request corresponding to the MPI message in a second set of match-request queues.

13. The method of claim 12, wherein queues in each of the first and second sets of match-request queues correspond to physical endpoints supported by the network interface controller.

14. The method of claim 13, wherein a respective physical endpoint comprises at least a priority list and an unexpected list.

15. The method of claim 14, further comprising using a unified search pipeline associated with the respective matching engine to search the priority list and the unexpected list.

16. The method of claim 12, further comprising selecting, by an arbitrator in the LPE, a match-request queue for dequeuing from the first and second sets of match-request queues.

17. The method of claim 11, further comprising processing, by a respective matching engine, the MPI message based on an eager protocol or a rendezvous protocol.

18. The method of claim 10, further comprising searching, by a respective matching engine, a persistent list-entry cache that stores previously matched list entries.

* * * * *